US007006841B2

(12) United States Patent
Monogioudis et al.

(10) Patent No.: US 7,006,841 B2
(45) Date of Patent: Feb. 28, 2006

(54) METHOD TO CONTROL BASE STATION TRANSMIT POWER DRIFT DURING SOFT HANDOFFS

(75) Inventors: Pantelis Monogioudis, Edison, NJ (US); Kiran M. Rege, Marlboro, NJ (US)

(73) Assignee: Lucent Technologies Inc, Murray Hill, NJ (US)

( * ) Notice: Subject to any disclaimer, the term of this patent is extended or adjusted under 35 U.S.C. 154(b) by 209 days.

(21) Appl. No.: 09/741,637

(22) Filed: Dec. 20, 2000

(65) Prior Publication Data

US 2002/0077140 A1    Jun. 20, 2002

(51) Int. Cl.
H04B 7/00    (2006.01)
(52) U.S. Cl. ................... 455/522; 455/436; 455/442; 370/318
(58) Field of Classification Search ............ 455/522, 455/13.4, 69, 422, 436–439, 442, 422.1, 455/67.3; 370/331–332, 317–318, 320
See application file for complete search history.

(56) References Cited

U.S. PATENT DOCUMENTS

| 5,946,634 | A  | * | 8/1999  | Korpela ................ 455/552 |
| 6,154,450 | A  | * | 11/2000 | Wallentin et al. .......... 370/311 |
| 6,259,927 | B1 | * | 7/2001  | Butovitsch et al. ........ 455/522 |
| 6,272,354 | B1 | * | 8/2001  | Saario .................. 455/552 |
| 6,275,478 | B1 | * | 8/2001  | Tiedemann, Jr. ........... 370/318 |
| 6,334,047 | B1 | * | 12/2001 | Andersson et al. ......... 455/69 |
| 6,393,276 | B1 | * | 5/2002  | Vanghi ................. 455/422.1 |
| 6,473,624 | B1 | * | 10/2002 | Corbett et al. ........... 455/522 |
| 6,487,191 | B1 | * | 11/2002 | Kang et al. .............. 370/342 |
| 6,490,460 | B1 | * | 12/2002 | Soliman ................. 455/522 |
| 6,650,905 | B1 | * | 11/2003 | Toskala et al. ............ 455/522 |
| 6,823,193 | B1 | * | 11/2004 | Persson et al. ............ 455/522 |

OTHER PUBLICATIONS

3 G Technical Specification (TS) 25.211 v3.2.0: "Physical Channels and Mapping of Transport Channels onto Physical Channels (FDD)", 3$^{rd}$ Generation Partnership Project (3GPP).
3 G Technical Specification (TS) 25.212 V.3.2.0: "Multiplexing and Channel Coding (FDD)", 3$^{rd}$ Generation Partnership Project (3GPP).
3 G Technical Specification (TS) 25.213 V.3.2.0: "Spreading and Modulation (FDD)", 3$^{rd}$ Generation Partnership Project (3GPP).
3 G Technical Specification (TS) 25.214 V.3.2.0: "Physical Layer Procedures (FDD)", 3$^{rd}$ Generation Partnership Project (3GPP).
3 G Technical Specification (TS) 25.215 V.3.2.0: "Physical Layer—Measurements (FDD)", 3$^{rd}$ Generation Partnership Project (3GPP).
3 G Technical Specification (TS) 25.331 V.3.3.0: "Radio Resource Control (RRC) Protocol Specification", 3$^{rd}$ Generation Partnership Project (3GPP.

* cited by examiner

*Primary Examiner*—William Trost
*Assistant Examiner*—Brandon J. Miller

(57) ABSTRACT

A UNMTS (universal mobile telecommunications system) based system comprises a common control point, a number of base stations, K, and a mobile terminal. During a soft handoff involving the K base stations and the mobile terminal, the common control point receives individual user channel transmit powers from each of the K base stations. In addition, the common control point receives two parameters from the mobile terminal—the identity of that base station involved in the soft handoff that has the strongest received signal at the mobile terminal and, on an average, a value representing how much stronger the received SNR was in comparison to the SNR target maintained by the mobile terminal. The common control point then decides on a downlink reference user channel transmit power for each of the base stations as a function of the individual user channel transmit powers reported by each base station involved in the soft handoff and the information provided from the mobile terminal.

21 Claims, 3 Drawing Sheets

METHOD TO CONTROL BASE STATION TRANSMIT POWER DRIFT DURING SOFT HANDOFFS

FIELD OF THE INVENTION

This invention relates generally to communications and, more particularly, to wireless systems.

BACKGROUND OF THE INVENTION

Many second and third generation wireless systems based on the Code Division Multiple Access (CDMA) technique employ fast power control on the uplink (e.g., from a mobile terminal to a base station) as well as the downlink (e.g., from a base station to a mobile terminal). Fast power control typically requires the receiver (either in the mobile terminal or the base station) to measure the local signal-to-noise ratio (SNR) during every transmission slot, compare it with a target SNR, and send a Transmit Power Control (TPC) command comprising one, or many, bits to the transmitter (also referred to herein as feedback bits). Upon receiving this TPC command, the transmitter then raises or lowers the transmit power by a fixed amount (in the dB domain). The transmission slots are, typically, of the order of a millisecond (e.g. 0.666 ms in UMTS (universal mobile telecommunications system), and 1.25 ms in IS-95 systems) so that the transmitter receives the feedback bits at a rate of about 1000 per second, allowing it to make rapid adjustments to the transmit power to counteract fading.

Unfortunately, during soft handoffs, fast power control gives rise to a transmit power drift problem in performing power control on the downlink. (Soft handoff is a condition in which a mobile terminal is in simultaneous communication with multiple base stations (or multiple sectors belonging to the same or different base stations in a sectorized setup). In a soft handoff, downlink transmissions to a mobile terminal are carried simultaneously by all of the base stations (or sectors) involved in the soft handoff whereas uplink signals (such as the above-mentioned TPC command) from the mobile terminal are independently received and decoded by these base stations (sectors).)

For example, let a mobile terminal be in soft handoff with K base stations: $B_1, B_2, \ldots B_K$, each having a respective common pilot channel transmit power: $P_1, P_2, \ldots, P_K$ (in units of dBm (decibels relative to one milliwatt)). Further, let the downlink transmit powers on the user channels allocated by each of these base stations to communicate with the mobile terminal be: $U_1(t), U_2(t), \ldots, U_K(t)$, respectively. (These powers are shown as functions of time, t, to emphasize the fact that they vary with time because of the above-mentioned power control.) Ideally, these downlink user channel transmit powers should vary in perfect synchrony. That is, if at time t the downlink transmit power on the first user channel associated with the first base station is equal to: $U_1(t)=P_1-D$, then, the downlink transmit powers on each of the other user channels should also be equal to: $U_2(t)=P_2-D$, $U_3(t)=P_3-D$, $\ldots$, and $U_K(t)=P_K-D$, respectively. (Typically, the downlink transmit power U(t) for a user channel is measured relative to the (fixed) common pilot channel power, P, (or the maximum transmit power) for an associated base station (or sector) which is usually set to achieve certain coverage—hence, U(t)=P−D, where D is a measure of the relative amount.)

Such synchronous behavior is possible if all of the base stations (sectors) involved in the soft handoff started off with the same transmit power (measured relative to their respective common pilot channel powers), and then received the same TPC command from the mobile terminal. Unfortunately, this is not possible. Even though the TPC command is effectively broadcast by the mobile terminal to all of the base stations involved in soft handoff—the signal conveying the TPC command is affected in different ways by the time it reaches the receiver of each base station (sector). For instance, some base stations (sectors) may receive the resultant TPC command practically error-free (if the corresponding uplinks are good) whereas the TPC command received by some other base stations may be significantly corrupted by noise if the corresponding uplinks are weak. Also, any errors in the TPC command received by different base stations (sectors) are likely to be independent. As a consequence, even if all base stations (sectors) started with the same transmit powers (relative to their respective common pilot channel powers)—at some point in time the user channel transmit powers associated with each base stations may drift away from one another over time—hence, the transmit power drift problem.

To rectify the power drift problem, it has been suggested by those in the art that the base stations (sectors) involved in soft handoff with a mobile terminal periodically report their user channel transmit powers (measured relative to their respective common pilot channel powers) to a common control point such as Radio Network Controller (RNC) in a UMTS system. The common control point then decides on a reference power using the individual transmit powers provided by the base stations (sectors) involved in the soft handoff and sends a message carrying this reference power to all of these base stations (sectors). When the base stations (sectors) receive this message, they reset their user channel transmit powers to the reference power indicated in that message and resume normal operation including responding to fast power control feedback bits of the TPC command.

SUMMARY OF THE INVENTION

The above-described solution for controlling transmit power drift involves a common control point deciding on a reference user channel transmit power using the individual user channel transmit powers provided by the base stations involved in the soft handoff. However, we have observed that additional care needs to be taken in the selection of the reference power by the common control point. For example, a base station involved in a soft handoff may have a weak uplink that has caused its user channel transmit power to drift way beyond what is needed to maintain good signal quality at the mobile terminal. However, if the common control point uses this particular user channel transmit power as the reference power setting for all the base stations involved in the soft handoff—it would clearly result in a waste of power. Therefore, and in accordance with the invention, we propose a scheme wherein the common control point decides on a downlink reference user channel transmit power using not only the individual user channel transmit powers provided by the base stations involved in the soft handoff but also information from the mobile terminal, itself.

In an embodiment of the invention, a UMTS-based system comprises a common control point, a number of base stations, K, and a mobile terminal. During a soft handoff involving the K base stations and the mobile terminal, the common control point receives individual user channel transmit powers from each of the K base stations. In addition, the common control point receives two parameters from the mobile terminal—the identity of that base station involved in the soft handoff that has the strongest received signal at the mobile terminal and, on an average, a value representing how much stronger the received SNR was in comparison to the SNR target maintained by the mobile terminal. (It should be noted there might be other definitions of excess SNR. For example, the amount by which the average of the total received SNR (from all base stations in communication with the mobile station) exceeds the target SNR.) Either the physical layer or higher-level layers (such as layer 3 of UMTS) can be used for communicating the relevant information between the mobile terminal and the common control point. The common control point then decides on a downlink reference user channel transmit power for each of the base stations as a function of the individual user channel transmit powers reported by each base station involved in the soft handoff and the information provided from the mobile terminal.

DETAILED DESCRIPTION

The inventive concept will be described in the context of a CDMA (Code Division Multiple Access)-based UMTS (universal mobile telecommunications system) Terrestrial Radio Access Network (UTRAN), such as that being developed by the $3^{rd}$ Generation Partnership Project (3GPP). (3GPP is a standards body comprising the European Telecommunication Standards Institution (ETSI) and several other international standards bodies. Additional information on 3GPP can be found at: "http://www.3gpp.org.")

Figure 1:
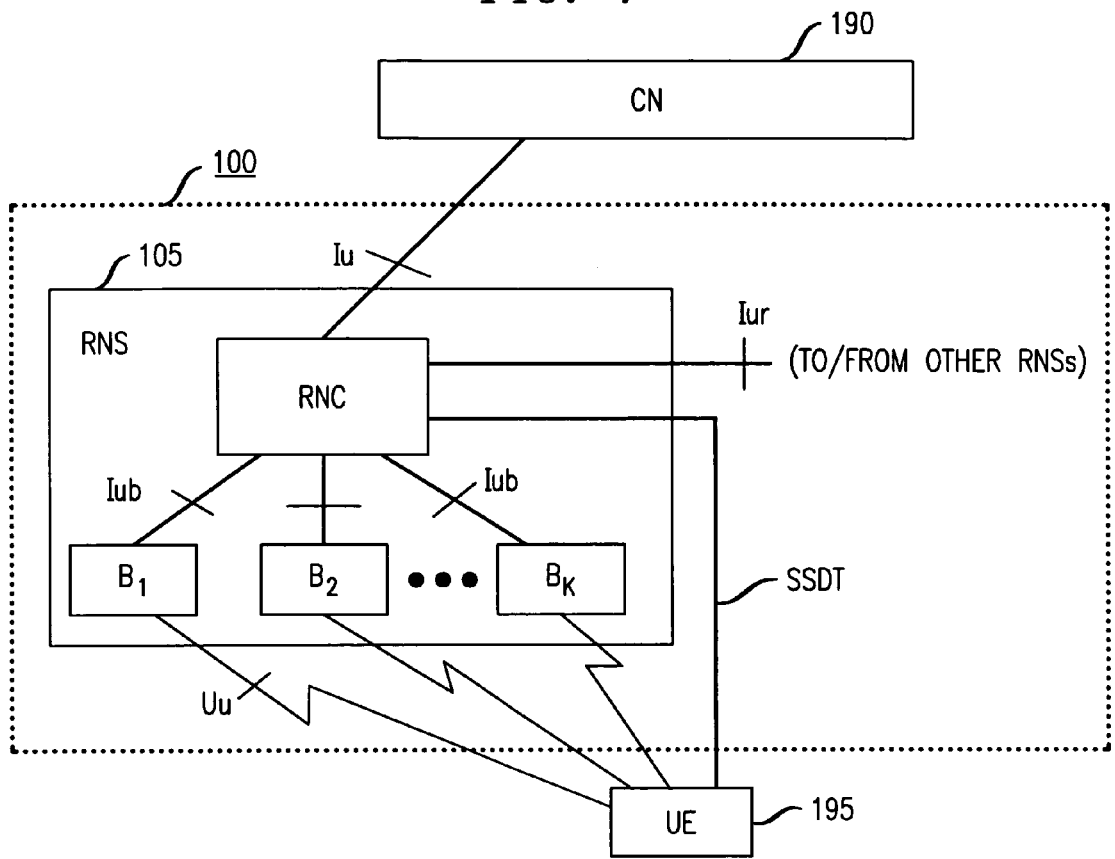
FIG. 1 shows a portion of a UTRAN based wireless system in accordance with the principles of the invention.

A portion of a UTRAN based wireless system in accordance with the principles of the invention is shown in FIG. 1. Other than the inventive concept, the elements and interfaces shown in FIG. 1 are well-known and will not be described in detail (e.g., see Technical Specification (TS) 25.401 V.3.3.0: UTRAN Overall Description for more information). UTRAN 100 is coupled to a core network (CN) 190 via an Iu interface. (The core network represents, e.g., other servers and gateways for providing access to the public switched telephone network and/or packet networks (like the Internet).) UTRAN 100 is also coupled to user equipment (UE) (e.g., a wireless mobile endpoint like a telephone and/or computer), as represented by UE 195, via interface Uu and, in accordance with the invention, a modified form of the Site Selection Diversity Transmit power control (SSDT) scheme. (Information on SSDT can be found in 3G Technical Specification (TS) 25.214 V.3.2.0: "Physical Layer Procedures (FDD)," $3^{rd}$ Generation Partnership Project (3GPP), and will not be described further herein.) UTRAN 100 comprises a radio network subsystem (RNS) as represented by RNS 105. The latter may also be coupled to other RNSs (not shown) via an Iur interface. RNS 105 comprises at least one radio network controller (RNC), and at least one Node B (hereafter referred to as a base station, or simply B) as represented by $B_1, B_2, \ldots, B_K$ of RNS 105. Each base station is coupled to the RNC through an Iub interface and is coupled to a UE through a Uu interface. For each connection between user equipment and the UTRAN, one RNS is the Serving RNS (here, illustratively, RNS 105). (It should be noted that the other RNS (not shown) could be what is referred to as a Drift RNS. However, this is not necessary to the inventive concept and will not be described further.)

For the purposes of describing the inventive concept, it is assumed that UE 195 is in soft handoff with K base stations $B_1, B_2, \ldots, B_K$ of RNS 105. (Soft handoff is known in the art and is not described herein.) Each base station has a respective common pilot channel powers $P_1, P_2, \ldots, P_K$ (measured in units of dBm). Every T units of time (e.g. seconds), base stations $B_1, B_2, \ldots, B_K$ reports their instantaneous downlink transmit powers associated with the user channel allocated to UE 105 (measured in units of dB relative to their respective common pilot channel powers) to a common control point, here represented by the RNC of RNS 105, via each Iub interface.

The user channel transmit powers are reported in the following manner. If the instantaneous transmit power for the concerned user channel at base station $B_n (1 \leq n \leq K)$ is $U_n$ (in units of dBm), then the power reported by the base station Bn to the common control point C is $D_n = P_n - U_n$, where $P_n$ is the corresponding common pilot channel power. All of the base stations involved in a soft handoff with a given UE report these power parameters synchronously, i.e., they report the power parameter associated with the same transmission slot. In accordance with the invention, the UE also periodically (preferably with the same period T) reports two parameters to the common control point C (again, represented here by the RNC). These parameters are the identity of the base station involved in soft handoff with the UE that provided the strongest received signal at the UE during the just concluded reporting interval, and (for this strongest received signal) on an average, how much stronger the received SNR was over that interval in comparison to the SNR target maintained by the UE (the excess SNR). These two parameters are referred to herein as Cell_ID and E respectively. It is assumed here that the latter is measured in units of dB.

Figure 2:
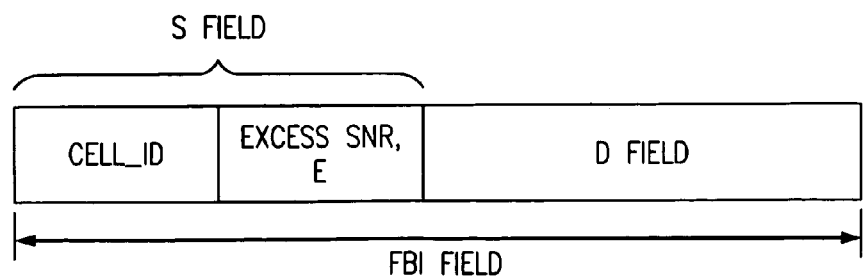
FIG. 2 shows an illustrative FBI (feedback information) field for use in conveying UE (user equipment) information to a common control point.

In accordance with a feature of the invention, this additional information from the UE is conveyed to the common control point C (the RNC) by suitable modification of the Site Selection Diversity Transmit power control (SSDT) scheme (noted earlier). In particular, in the existing standard (e.g., see the above-mentioned TS 25.214) SSDT already enables a UE to report the identity of the strongest base station via FBI (feedback information) bits. These FBI bits are used to support techniques requiring feedback from the UE to a UTRAN Access Point, including closed loop mode transmit diversity and SSDT. The FBI bits comprise two fields: an S field and a D field. The S field is used for SSDT signaling, while the D field is used for closed loop mode transmit diversity signaling. In accordance with the inventive concept, the FBI bits, e.g., the S field, are modified to also convey the excess signal to noise ratio, E, from the UE during a soft handoff. An illustrative structure for such an FBI field is shown in FIG. 2.

Thus, at the end of every reporting interval (of duration T), the common control point C has; the power parameters $D_1, D_2, \ldots, D_K$ received from the K base stations involved in the soft handoff, and the two parameters Cell_ID and E reported by the UE. In the simplest possible implementation of the invention, the controller C calculates the reference power, R, in the following manner:

If $D_{CELL\_ID}$ is the power parameter reported by the base station that was identified as the strongest base station by the UE (via a received Cell_ID) in the just concluded interval, then $$R = D_{CELL\_ID} + E. \quad (1)$$

In other words, the common control point C sets the reference power to a value that equals the sum of the power parameter associated with the strongest base station reported by the UE and the excess signal to noise ratio (E) reported by the UE (both measured in units of dB). The common control point C then sends a message carrying the value of R to all of the base stations involved in the soft handoff. When the base stations $B_1, B_2, \ldots, B_K$ receive this message, they adjust, or reset, their respective user channel transmit powers, $U_1, U_2, \ldots, U_K$, as follows:

$$U_n = P_n - R, \; 1 \leq n \leq K; \quad (2)$$

and resume normal operation.

Figure 3:
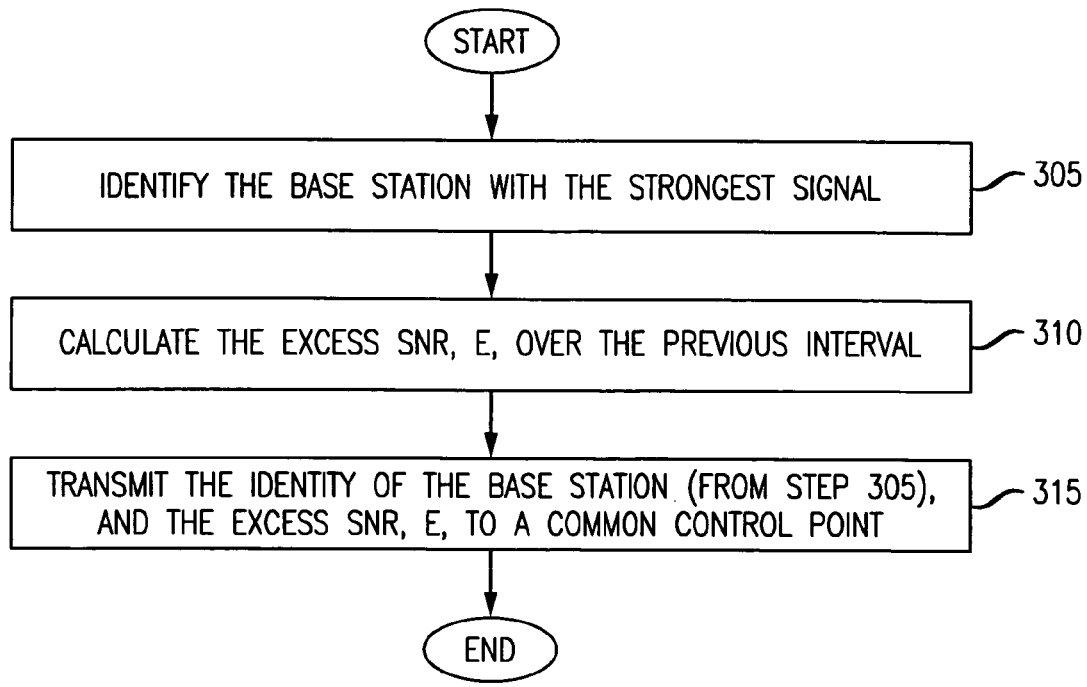
FIGS. 3 and 4 show illustrative flow charts embodying the principles of the invention.
Figure 4:
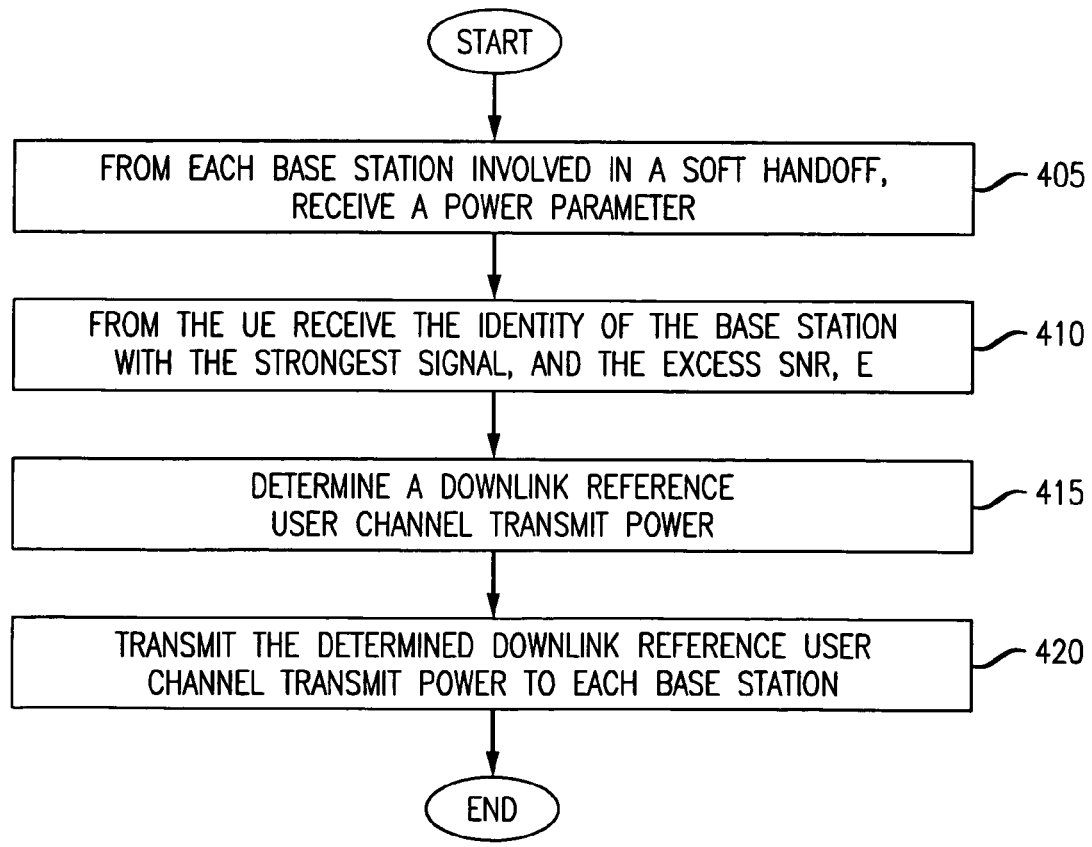

Reference should now also be made to FIGS. 3 and 4, which show illustrative high-level flow charts embodying the principles of the invention. (The inventive concept is implemented using conventional programming techniques, which as such, will not be described herein.)

The flow chart of FIG. 3 shows an illustrative method for use in a UE in accordance with the principles of the invention. As noted above, it is assumed that the UE is in soft handoff with K base stations. It is also assumed that the steps of FIG. 3 are performed every reporting interval, T. In step 305, the UE identifies that base station with the strongest received signal over the previous reporting interval, T (Obviously, if more than one base station qualifies, a simple selection method is used.) This identity is stored in the variable Cell_ID. In step 310, the UE calculates the excess SNR, E. For example, for the received signal from the base station identified by Cell_ID, the UE calculates, on average, how much stronger the received SNR was over that previous reporting interval, T, in comparison to the SNR target maintained by the UE. (As noted earlier, the UE has an SNR target for performing power control.) In step 315, the UE transmits to a common control point (e.g., the RNC of RNS 105 of FIG. 1), Cell_ID and E in accordance with the above-mentioned modified SSDT scheme.

Turning now to FIG. 4, this figure shows an illustrative method for use in a common control point in accordance with the principles of the invention. It is assumed that the steps of FIG. 4 are performed every reporting interval, T. In step 405, the common control point receives a power parameter from each base station involved in the soft handoff, where the power parameter represents a downlink user channel transmit power. In step 410, the common control point receives, from the UE, the identity of the base station with the strongest received signal, via Cell_ID, and the excess SNR, E. In step 415, the common control point determines a downlink reference user channel transmit power, R, in accordance with equation (1), above, using the value of E and the associated power parameter from the base station identified by Cell_ID. In step 420, the common control point transmits the determined downlink reference user channel transmit power, R, to each base station involved in the soft handoff. As noted above, upon receipt of R, each base station adjusts, or resets, their respective user channel transmit powers in accordance with equation (2), above.

Figure 5:
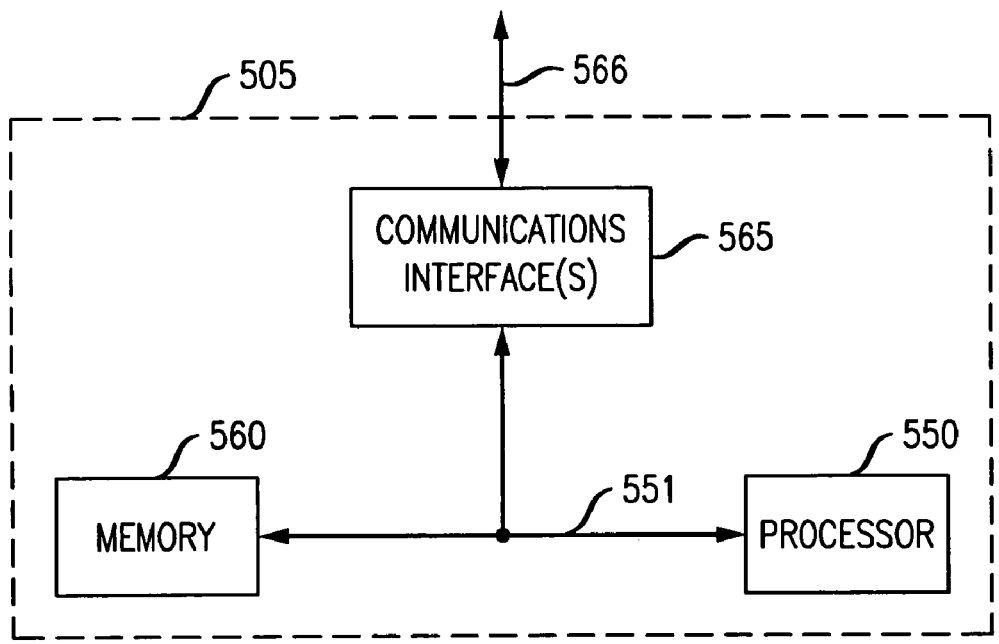
FIG. 5 shows an illustrative high-level block diagram of a wireless network element for use in accordance with the principles of the invention.

Turning briefly to FIG. 5, a high-level block diagram of a representative wireless network element 505 for use in accordance with the principles of the invention is shown. Wireless network element 505 is generally representative of any wireless element, e.g., a UE or an RNC. Wireless network element 505 is a stored-program-control based processor architecture and includes processor 550, memory 560 (for storing program instructions and data, e.g., for forming the above-described data frames illustrated in FIG. 2, or for performing the flow charts illustrated in FIGS. 3 and 4, etc.) and communications interface(s) 565 for coupling to one or more communication paths (e.g., uU, SSDT) as represented by path 566 (e.g., 565 represents a transmitter and a receiver).

As a result of the above, the inventive concept rectifies the transmit power drift problem by allowing the common control point to make a better decision as to where to set the reference user channel transmit power. In addition, relatively few changes are required to the existing standard.

Figure 6:
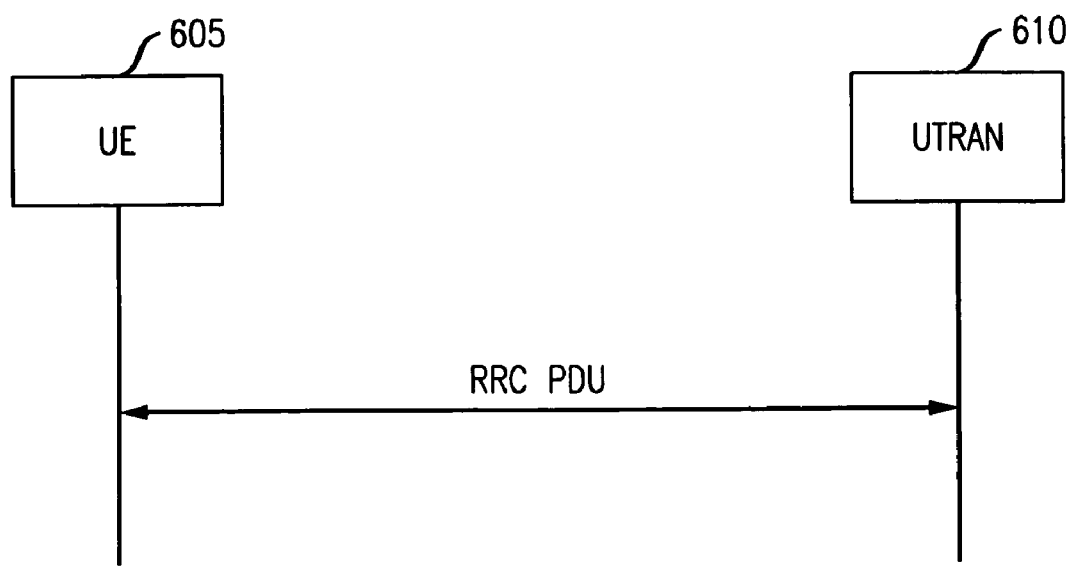
FIG. 6 shows another embodiment of the inventive concept.

It should be noted that alternative implementations of the inventive concept are possible. For example, instead of using the physical layer for signaling (as illustratively described above), higher level layers can be modified in accordance with the inventive concept, such as (but not limited to) use of the Radio Resource Control (RRC) protocol of layer 3 in UMTS (e.g., see 3G Technical Specification (TS) 25.331 V.3.3.0: "Radio Resource (Control (RRC) Protocol Specification," $3^{rd}$ Generation Partnership Project (3GPP)). Having described the inventive concept, an RRC Protocol Data Unit (PDU) can be modified in a straightforward manner to include the ability to transport the above-described FBI information (e.g., of FIG. 2). This is illustrated in FIG. 6. The FBI bits are communicated from UE 605 to a UTRAN Access Point 610 via RRC.

The foregoing merely illustrates the principles of the invention and it will thus be appreciated that those skilled in the art will be able to devise numerous alternative arrangements which, although not explicitly described herein, embody the principles of the invention and are within its spirit and scope. For example, it is possible to create variations of this scheme without affecting the essence of it. For instance, one could use a function, $f(E)$, of the excess parameter reported by the UE while calculating the reference power R. In this case, R would equal $D_{CELL\_ID} + f(E)$ rather than simply $D_{CELL\_ID} + E$. An example of such a function could be the quantization function. In fact, even though the inventive concept was described in term of selecting the strongest base station at the UE, the selected base station could simply be stronger in received signal strength than other base stations.

Also, although described in the context of a UTRAN-based wireless system, the inventive concept is not so restricted and is applicable to any wireless system incorporating power control. Further although described in the context of base stations, the inventive concept is also applicable to a "sectorized" architecture as known in the art.

What is claimed:

1. A method for use in wireless equipment, the method comprising the steps of:
    receiving user channel transmit power information from base stations involved in a soft handoff with user equipment; and
    receiving information from the user equipment, the information received from the user equipment comprising a value representative of an excess signal-to-noise ratio determined by the user equipment as the amount by which a signal-to-noise ratio value of one or more user channel signals received at the user equipment exceeds a target signal-to-noise ratio value;

wherein the wireless equipment determines a referunce user transmit power level for use by the base stations as a function of the received user channel transmit power information and the received information from the user equipment.

2. The method of claim 1 wherein the information received from the user equipment comprises a value representative of the excess signal-to-noise ratio of a user channel signal received from one of the base stations that is stronger than the user channel signal received from another of the base stations.

3. A method for use in wireless equipment, the method comprising the steps of:

receiving user channel transmit power information from base stations involved in a soft handoff with user equipment; and receiving information from the user equipment, wherein the information comprises an identifier of a base station with a received signal at the user equipment that is stronger than the received signal of other base stations and a signal-to-noise ratio value of the signal received from the identified base station;

determining a downlink reference power from the received user channel transmit power information and from the base station identifier and the signal-to-noise ratio value in the received information from the user equipment; and transmitting the determined downlink reference power to the base stations.

4. The method of claim 3 wherein the signal-to-noise ratio value represents an excess signal to noise ratio value determined as the amount by which the signal-to-noise ratio value of the signal received from the identified base station exceeds a target signal-to-noise ratio value.

5. A method for use in wireless equipment during a soft handoff of user equipment with a number of base stations, the method comprising the steps of:

identifying, at the user equipment, a base station with a received signal at the user equipment that is stronger than the received signal of one or more other base stations; and calculating, at the user equipment, a signal-to-noise ratio value of the signal received from the identified base station; and transmitting the identity of the identified base station and the calculated signal-to-noise ratio value from the user equipment to a control point of a wireless system, wherein the calculated signal-to-noise ratio value represents an excess signal-to-noise ratio value determined as the amount by which the signal-to-noise ratio value of the signal received from the identified base station exceeds a target signal-to-noise ratio value.

6. The method of claim 5 wherein the control point is a common control point.

7. Apparatus for use in wireless equipment, the apparatus comprising:

a receiver for receiving user channel transmit power information from base stations involved in a soft handoff with user equipment, and receiving information from the user equipment; and a processor for determining a reference user transmit power level for use by the base stations as a function of the received user channel transmit power information and the received information from the user equipment, wherein the information received from the user equipment comprises an excess signal-to-noise ratio value determined as the amount by which a signal-to-noise ratio value of one or more user channel signals received at the user equipment exceeds a target signal-to-noise ratio value.

8. The apparatus of claim 7 wherein the information received from the user equipment comprises a value representative of the excess signal-to-noise ratio of a user channel signal received from one of the base stations that is stronger than the user channel signal received from another of the base stations.

9. Apparatus for use in wireless equipment, the apparatus comprising:

a transceiver for (a) receiving user channel transmit power information from base stations involved in a soft handoff with user equipment, (b) receiving information from the user equipment, wherein the information comprises an identifier of a base station with a received signal at the user equipment that is stronger than the received signal of one or more other base stations and a signal-to-noise ratio value determined by the user equipment for the user channel signal received from the identified base station, and (c) transmitting a downlink reference power to the base stations; and a processor for use in determining the downlink reference power from the received user channel transmit power information and from the base station identifier and the signal-to-noise ratio value in the received information from the user equipment.

10. The apparatus of claim 9 wherein the signal-to-noise ratio value represents an excess signal to noise ratio value determined as the amount by which a signal-to-noise ratio value measured by the user equipment for the user channel signal received from the identified base station exceeds a target signal-to-noise ratio value.

11. Apparatus for use in wireless equipment during a soft handoff with a number of base stations, the apparatus comprising user equipment having:

a processor for use in (a) identifying a base station with a received signal at the user equipment stronger than the received signal of one or more other base stations, and (b) calculating a signal-to-noise ratio value for the user channel signal received from the identified base station; and a transmitter for transmitting the identity of the identified base station and the calculated signal-to-noise ratio value to a control point of a wireless system, wherein the calculated signal-to-noise ratio value represents an excess signal-to-noise ratio value determined as the amount by which a signal-to-noise ratio value associated with the received signal from the identified base station exceeds a target signal-to-noise ratio value.

12. The apparatus of claim 11 wherein the control point is a common control point.

13. A transmission frame representing data embodied in a wireless transmission signal transmitted from user equipment to at least one base station, the transmission frame comprising:

a first portion of a field comprising at least one bit for conveying data representative of an identifier for identifying a base station whose received signal at the user equipment is stronger than signals received at the user equipment from one or more other base stations; and a second portion of the field comprising at least one bit for conveying data representative of a signal-to-noise ratio value of the received signal from the identified base station at the user equipment, wherein the signal-tonoise ratio value represents an excess signal-to-noise ratio value determined as the amount by which the signal-to-noise ratio value of the signal received from the identified base station exceeds a target signal-to-noise ratio value.

14. The transmission frame of claim 13 wherein the transmission frame is conveyed via a radio resource control based protocol.

15. The transmission frame of claim 13 wherein the transmission frame is conveyed via physical layer signaling.

16. The method of claim 2, wherein the received information from the user equipment comprises a value representative of the excess signal-to-noise ratio for the strongest received user channel transmit power signal.

17. The method of claim 1, wherein:
the base stations use the reference user transmit power level during a fast power control loop;
the user equipment determines the reference user transmit power level in a slow control loop; and
the fast power control loop is implemented multiple times for each implementation of the slow control loop.

18. The method of claim 3, wherein:
the base stations use the determined downlink reference power during a fast power control loop;
the user equipment determines the determined downlink reference power in a slow control loop; and
the fast power control loop is implemented multiple times for each implementation of the slow control loop.

19. The method of claim 3, wherein the downlink reference power is determined by summing (i) the user channel transmit power for the identified base station and (ii) a value based on the signal-to-noise value.

20. The apparatus of claim 9, wherein the processor is adapted to determine the downlink reference power by summing (i) the user channel transmit power for the identified base station and (ii) a value based on the signal-to-noise value.

21. A method for use in wireless equipment, the method comprising the steps of:
receiving user channel transmit power information from base stations involved in a soft handoff with user equipment; and
receiving information from the user equipment, wherein the information comprises an identifier of a base station with a received signal at the user equipment that is stronger than the received signal of other base stations and a signal-to-noise ratio value of the signal received from the identified base station;
determining a downlink reference power from the received user channel transmit power information and the received information from the user equipment; and
transmitting the determined downlink reference power to the base stations, wherein:
the base stations use the determined downlink reference power during a fast power control loop;
the user equipment determines the determined downlink reference power in a slow control loop; and
the fast power control loop is implemented multiple times for each implementation of the slow control loop.

* * * * *